(12) United States Patent
Choi

(10) Patent No.: US 9,965,171 B2
(45) Date of Patent: May 8, 2018

(54) DYNAMIC APPLICATION ASSOCIATION WITH HAND-WRITTEN PATTERN

(71) Applicant: Samsung Electronics Co., Ltd., Suwon-si, Gyeonggi-do (KR)

(72) Inventor: Sejin Choi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 14/104,346

(22) Filed: Dec. 12, 2013

(65) Prior Publication Data

US 2015/0169213 A1 Jun. 18, 2015

(51) Int. Cl.
*G06F 3/0488* (2013.01)
*G06F 3/0484* (2013.01)
*G06F 3/16* (2006.01)

(52) U.S. Cl.
CPC ...... *G06F 3/04883* (2013.01); *G06F 3/04842* (2013.01); *G06F 3/167* (2013.01)

(58) Field of Classification Search
CPC ............................. G06F 3/167; G06F 3/04883
See application file for complete search history.

(56) References Cited

U.S. PATENT DOCUMENTS

| 7,788,245 | B1 | 8/2010 | Eddings et al. | |
|---|---|---|---|---|
| 2002/0065820 | A1 | 5/2002 | Enns | |
| 2010/0005428 | A1* | 1/2010 | Ikeda | G06F 3/04883 715/863 |
| 2010/0162181 | A1 | 6/2010 | Shiplacoff et al. | |
| 2011/0041102 | A1 | 2/2011 | Kim | |
| 2011/0054837 | A1* | 3/2011 | Ikeda | G06F 3/0414 702/155 |
| 2011/0072393 | A1* | 3/2011 | Wilairat | G06F 3/0488 715/811 |
| 2011/0107206 | A1* | 5/2011 | Walsh | G06F 17/2785 715/256 |
| 2011/0246944 | A1 | 10/2011 | Byrne et al. | |
| 2011/0246952 | A1* | 10/2011 | Tsao | G06F 3/04883 715/863 |
| 2012/0044179 | A1* | 2/2012 | Hudson | G06F 3/04883 345/173 |
| 2013/0080964 | A1* | 3/2013 | Shigeta | G06F 3/0488 715/773 |
| 2014/0026055 | A1* | 1/2014 | Cohn | G06F 3/0482 715/727 |
| 2014/0033136 | A1* | 1/2014 | St. Clair | G06F 3/017 715/863 |
| 2014/0088970 | A1* | 3/2014 | Kang | G06F 3/167 704/260 |
| 2014/0109019 | A1* | 4/2014 | Rana | G06F 3/033 715/863 |
| 2014/0143664 | A1* | 5/2014 | Tsang | G06F 9/543 715/256 |

FOREIGN PATENT DOCUMENTS

CN 103064922 A 4/2013
KR 10-2010-0013539 A 2/2010

\* cited by examiner

*Primary Examiner* — Anil Bhargava
(74) *Attorney, Agent, or Firm* — Jefferson IP Law, LLP

(57) ABSTRACT

An apparatus and a method for performing an application in response to a command are provided. The apparatus includes a display device configured to display text on the apparatus, an input unit configured to select the displayed text, and a controller configured to execute an application associated with the selected text in response to the command entered into the input unit.

13 Claims, 4 Drawing Sheets

DYNAMIC APPLICATION ASSOCIATION WITH HAND-WRITTEN PATTERN

TECHNICAL FIELD

The present disclosure relates generally to a method and apparatus for selecting characters displayed on a screen of the apparatus and invoking an operation associated with the selected characters. More particularly, the present disclosure relates to a method and apparatus for selecting characters displayed on a screen of an apparatus and invoking an operation associated with the selected characters in response to a user's touch on the screen of the apparatus and/or in response to a voice command of the user of the apparatus.

BACKGROUND

In today's portable electronic devices, such as mobile phones, selecting random text from electronic text displayed on the screen of the mobile phone requires a certain operation associated with the selected text that is not easy. For example, if there's random text content that needs to be searched with a search engine, the content needs to be cut and pasted to a web search box unless the text is preconfigured as a recognized key word.

For example, contacting a person whose full or partial name appears on electronic text displayed on the screen of the portable electronic device requires a cumbersome process. Such process may include scrolling through a long list of contacts to find the contact information of the person whose name appears on the text displayed on the screen of the portable device. However, this process may not be necessary when the text is in a predetermined format, such as a phone number or an e-mail address. Nevertheless, this process is cumbersome and in many occasions inaccurate when the user of the portable electronic device has too many contacts.

There is a software solution to this cumbersome process such termed gestureCall. This software provides a way to call a person whose name is displayed on the screen of the portable electronic device by using configurable drawings executed on a touch screen of the portable electronic device. However, the applicability of this software is very limited since the software requires assigning a different drawing per contact point or person. Therefore, when the number of contacts configured with gestureCall is large, it is not feasible to expect that the user of the portable electronic device remember all different types of drawings assigned to each contact point or person. Also, this software does not provide any capability of selecting random text displayed on the screen of the portable electronic device to find certain contact point or person and invoke a certain operation such as e-mail, call or SMS.

There are other methods and systems for dynamically generating search links embedded in content. For example, U.S. Pat. No. 7,788,245 B1 to Eddings et al. (hereinafter Eddings) describes a mechanism to automatically embed generated search link. However, this mechanism requires full analysis of the document each time a new electronic text is opened and the text need to be of a pre-recognized topic to find search terms. Therefore, it is not possible to select a random text to invoke a search without fully analyzing the documents.

Meanwhile, US 2002/0065820 A1 to Enns (hereinafter Enns) discloses a process for automatically identifying a telephone number in electronic text. For example, Enns describes a process to identify a potential phone number from an electronic text. However, this process does not consider a case where a full name or part of the name appears in electronic text displayed on the portable electronic device, associates the name with a contact when the contact is selected, and makes an automatic phone call or sends an e-mail. Therefore, these types of actions are not possible with this approach.

Finally, US 2010/0162181 A1 to Shiplacoff et al. (hereinafter Shiplacoff) discloses interpreting gesture input including introduction or removal of a point of contact while a gesture is in progress. Shiplacoff does not describe a mechanism to perform operations associated with a gesture on an existing contact point. In other words, Shiplacoff is not intended to associate a randomly selected text string to find a contact point and make an automatic calling.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for selecting characters displayed on a screen of a portable apparatus and invoking an operation associated with the selected characters in response to a user's touch command on the screen of the apparatus and/or in response to a voice command of the user of the apparatus. It is noted that the apparatus may be an electronic device and the terms will be used interchangeably throughout the specification.

In accordance with an aspect of the present disclosure, a method for executing an application in an electronic device in response to a command is provided. The method includes selecting text displayed on the electronic device, performing the command on the electronic device after selecting the text displayed on the electronic device, and executing the application associated with the performed command.

In accordance with another aspect of the present disclosure, a method for associating an application to a command in an electronic device is provided. The method includes selecting an application from a menu of applications displayed on the electronic device, assigning a command to the selected application, and storing the assigned command corresponding to the selected application.

In accordance with another aspect of the present disclosure, an apparatus for performing an application in response to a command is provided. The apparatus includes a display device configured to display text on the apparatus, an input unit configured to select the displayed text, and a controller configured to execute an application associated with the selected text in response to the command entered into the input unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
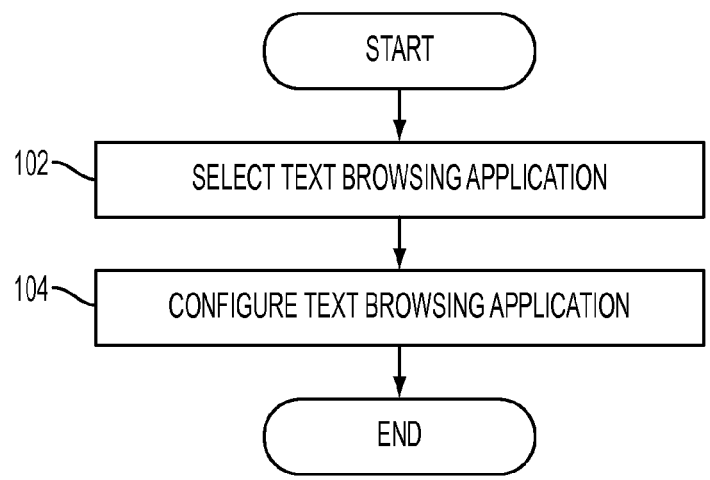
FIG. 1 is a flowchart depicting a method of configuring an electronic device to perform an operation associated with selecting characters displayed on the electronic device according to an embodiment of the present disclosure.

FIG. 1 is a flowchart depicting a method of configuring an electronic device to perform an operation associated with selecting characters displayed on the electronic device according to an embodiment of the present disclosure.

Referring to FIG. 1, a user of the electronic device selects an application from a list of applications stored in the memory of the electronic device at operation 102. The applications may include text browning applications, such as a web application, an email application, a messenger application, etc. However, it is noted that the applications are not limited to the above discussed applications and any type of application from which characters can be selected can be configurable according to an embodiment of the present disclosure.

At operation 104, the user of the electronic device upon selecting an application, as noted above at operation 102, proceeds to assign a gesture to a corresponding application. For example, if the user of the electronic device would like to perform a web search on selected text, the user could configure the web application to recognize a gesture in form of a letter "w." Similarly, if the user of the electronic device would like to compose an e-mail to a person whose name appears on text displayed on the electronic device, the user can configure the device to recognize a gesture in form of the letter "e" as a command to compose an e-mail. Also, if the user of the electronic device would like to compose a message such as an SMS message to a person whose name appears on text displayed on the electronic device and whose name has been selected, the user can configure the device to recognize a gesture in form of the letter "t" as a command to compose an SMS message or text. Similarly, if the user of the electronic device would like to call a person whose name appears on text displayed on the electronic device, the user can configure the device to recognize a gesture in form of the letter "c" as a command to call. However, it is noted that the assignation of particular letters to execute the particular functions described above is not limited thereto and the user could freely assign other types of letters, characters, icons, etc., to execute the function.

It is further noted that although FIG. 1 discloses a method of configuring the electronic device to perform an operation associated with selecting characters displayed on the electronic device, the electronic device can already be preconfigured with certain characters, icons, etc., to execute these functions. Therefore, the user of the electronic device can have the option of using the preconfigured settings provided by the manufacturer of the electronic device or the user of the electronic device can configure the settings as described in FIG. 1.

Figure 2:
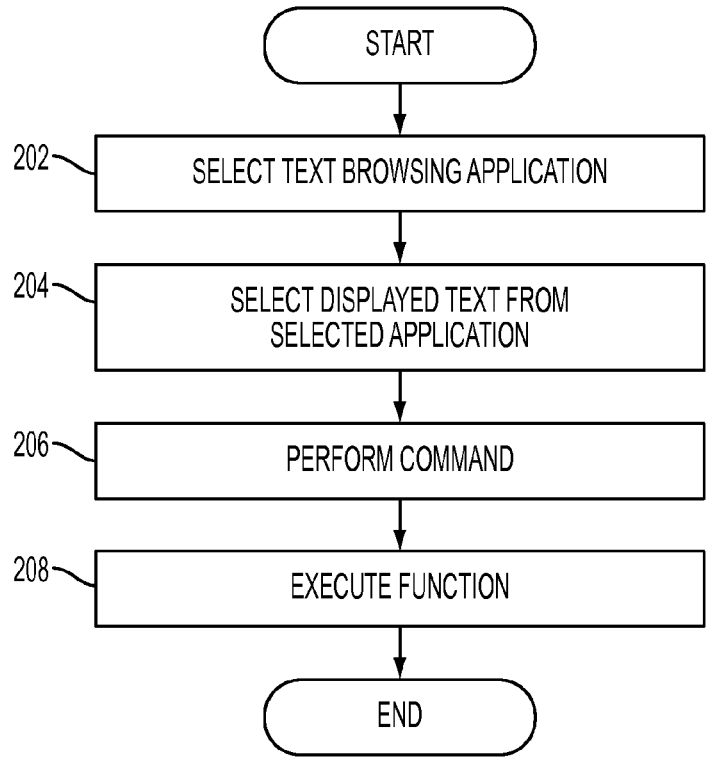
FIG. 2 is a flowchart depicting a method of executing a function on an electronic device associated with selecting characters displayed on the electronic device according to an embodiment of the present disclosure.

FIG. 2 is a flowchart depicting a method of executing a function on an electronic device associated with selecting characters displayed on the electronic device according to an embodiment of the present disclosure;

Referring to FIG. 2, the user of the electronic device selects a text browsing application from a list of text browsing applications at operation 202. For example, the user of the electronic device may be provided with a list of several text browsing applications such as web, email, SMS, etc. However, it is noted that this list is not limited thereto and other applications may be provided to the user of the electronic device. Upon selecting the text browsing application and executing the application, the user of the electronic device selects specific characters displayed on the screen of the electronic device at operation 204. For example, if the user selects an email application and retrieves an email from the inbox, the user may then select specific text included in the opened email, such as the name of a contact. The user may select the text through a variety of ways, such as by simply circling a finger around the text or by utilizing an instrument such as a pen.

Once the specific text has been selected, at operation 206 the user may perform a particular command at which point the electronic device executes a function associated with the performed command. For example, if the command performed on the selected text displayed on the electronic device is a touch command in form of a gesture resembling the letter "c," the electronic device will interpret such gesture as a command to place a phone call to the contact and execute the function at operation 208. It is noted that once the command has been performed, the electronic device will search through a directory of contacts stored in the electronic device for a contact matching the selected contact, find a phone number of the contact and perform the call. However, it is noted that other processes may be involved in the execution of this function when more than one contact exists in the directory having a name matching the selected text. A more detailed description of such process will be explained later with respect to FIG. 6. Finally, a detailed process of the search process will be omitted from the description since such processes are conventional in the art.

Figure 3:
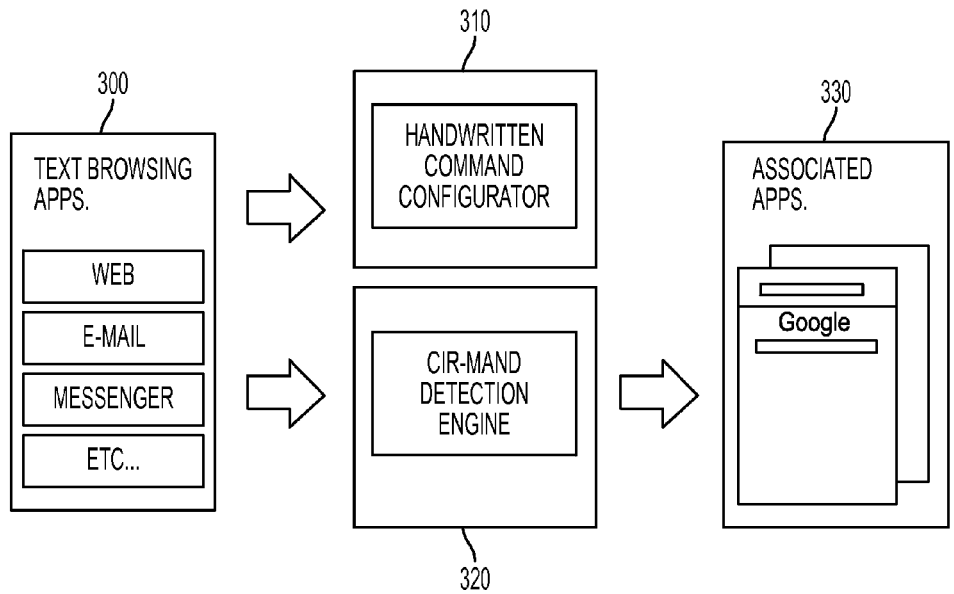
FIG. 3 depicts an overall architecture of a method of configuring an electronic device to invoke an operation associated with selected characters displayed on the electronic device according to an embodiment of the present disclosure.

FIG. 3 depicts an overall architecture of a method of configuring an electronic device to invoke an operation associated with selected characters displayed on the electronic device according to an embodiment of the present disclosure.

Referring to FIG. 3, a user of an electronic device accesses a menu 300 providing a variety of text browsing applications. From the displayed menu 300, the user selects a text browsing application as described above at operation 102 of FIG. 1. Thereafter, the user of the device configures the text browsing application through a command configurator menu 310. That is, the user of the device can assign different commands in form of gestures or voice commands to execute different functions. As noted above with respect to FIG. 1 at item 104, the user can assign a gesture in the form of a letter "w" to execute a web search function after the user has selected text displayed on a screen of the electronic device. Once the text browsing applications have been configured the user of the electronic device can select text displayed on the electronic apparatus and perform the configured gesture. A detection engine 320 will determine a type of gesture performed and the function will be executed 330 on the electronic device.

Figure 4:
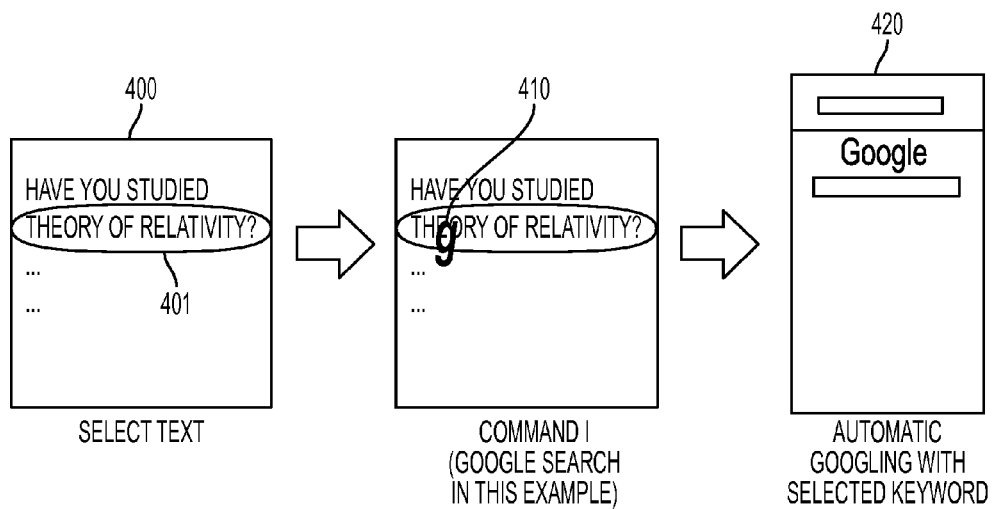
FIG. 4 depicts an example of performing a web search in response to a gesture performed on characters selected from a single line of text displayed on a screen of an electronic device according to an embodiment of the present disclosure.

FIG. 4 depicts an example of performing a web search in response to a gesture performed on characters selected from a single line of text displayed on a screen of an electronic device according to an embodiment of the present disclosure.

Referring to FIG. 4, a user of the electronic device may access an application provided by the electronic device. For example, a user may access a text application 400. From the text displayed in the application, the user may select specific text 401 using his finger or a device, such as a pen, used for interacting with the electronic device. However, it is noted that the selection of the text is not limited thereto and the user of the electronic device may use other devices to select the text displayed on the electronic device. After selecting the specific text 401 by circling the displayed text, the user of the electronic device makes a gesture 410 and the application associated with the gesture is executed 420. In this case, the user selects the terms "Theory of Relativity" from the text displayed on the electronic device, then the user generates the gesture "g" and the electronic device proceeds to perform a web search for the terms "Theory of Relativity." In more detail, the user of the electronic device can selected the term "Theory of Relativity" using his finger. Alternatively, the user of the electronic device can select the term "Theory of Relativity" by using a device, such as a pen used for interacting with electronic devices. However, it is noted that the selection of the text is not limited thereto and the user of the electronic device may select the text through other forms, such as for example a voice command or any other types of commands. Similarly, the gesture 410 performed by the user is not limited to the letter "g" and any other types of letters, drawings, icons or voice commands can be used as gestures. Finally, the executed application 420 is not limited to a web search. Instead, the executed application can be any application provided by the electronic device, such as email, text, voice call, etc. Similarly, although FIG. 4 illustrates a web search using "Google," the web search is not limited to such search engine and any other search engines can be used. For example, although not illustrated in FIG. 4, a menu may be displayed after the user performs the gesture asking the user of the electronic device to select a preferred search engine.

Figure 5:
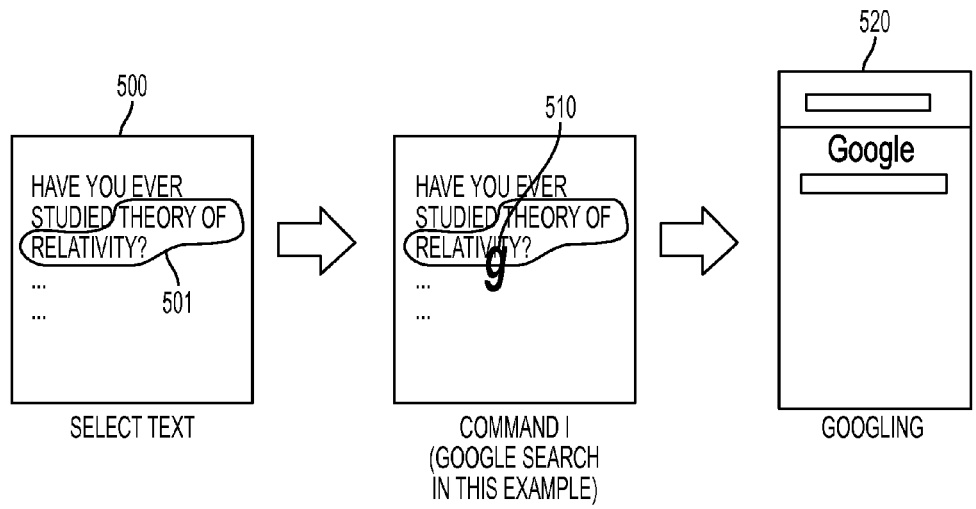
FIG. 5 depicts an example of performing a web search in response to a gesture performed on characters selected from more than one line of text displayed on a screen of an electronic device according to an embodiment of the present disclosure.

FIG. 5 depicts an example of performing a web search in response to a gesture performed on characters selected from more than one line of text displayed on a screen of an electronic device according to an embodiment of the present disclosure. Referring to FIG. 5, similarly to FIG. 4, a user of the electronic device may access an application provided by the electronic device. For example, a user may access a text application 500. From the displayed text, the user of the electronic device may select text 501 using his finger or a device, such as a pen, as discussed above. The distinction between the present embodiment and the embodiment discussed above with reference to FIG. 5 is that in the instant case, the user of the device selects text that is displayed in more than one line. That is, according to this embodiment of the present disclosure, the user of the electronic device may select text 501 that is in multiple lines. After selecting the text 501 by circling the displayed text, the user of the electronic device makes a gesture 510 and the application associated with the gesture is executed 520. In this case, similarly to FIG. 4, the user selects the terms "Theory of Relativity" from the text displayed on the electronic device. However, the selected terms are found in more than one line of the displayed text. Also, although not illustrated in FIG. 5, the selection of the text is not limited to a single instance before having to perform the gesture. That is, the user of the electronic device may select various pieces of text, i.e., various circles, and then execute the application. For example, if the user of the electronic device would like to search for a term that is not found in consecutive text or lines, the user may selected various terms throughout the displayed text and upon performing a gesture, the application would execute a search containing all such selected terms.

Figure 6:
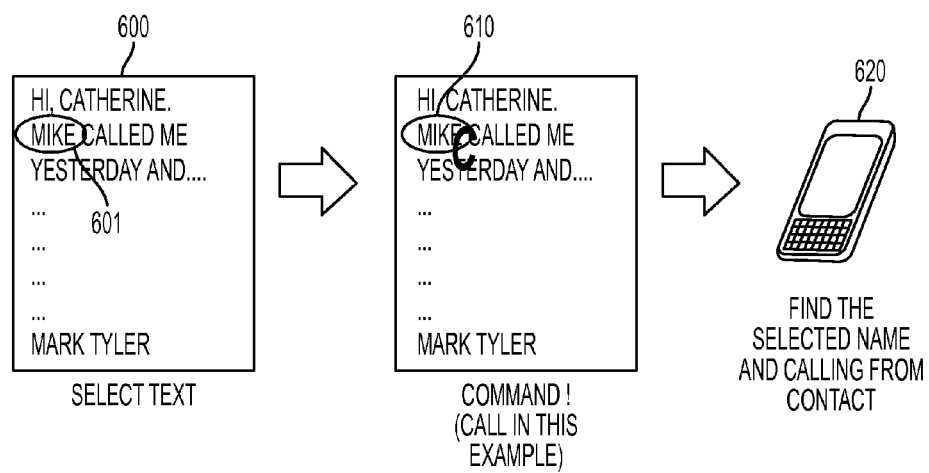
FIG. 6 depicts an example of performing a phone call in response to a gesture performed on characters selected from text displayed on a screen of an electronic device according to an embodiment of the present disclosure.

FIG. 6 depicts an example of performing a phone call in response to a gesture performed on characters selected from text displayed on a screen of an electronic device according to an embodiment of the present disclosure.

Similarly to FIGS. 4 and 5 a user of the electronic device accesses an application displaying text 600 on the electronic device. From the displayed text 600, the user selects text 601. In the instant case, the user of the electronic device selects the name "Mike" from a received text message. Thereafter, the user of the electronic device performs a particular gesture 610 and the electronic device executes an operation such as placing a call to Mike's phone 620 after searching and retrieving the contact information stored in the electronic device.

Figure 7:
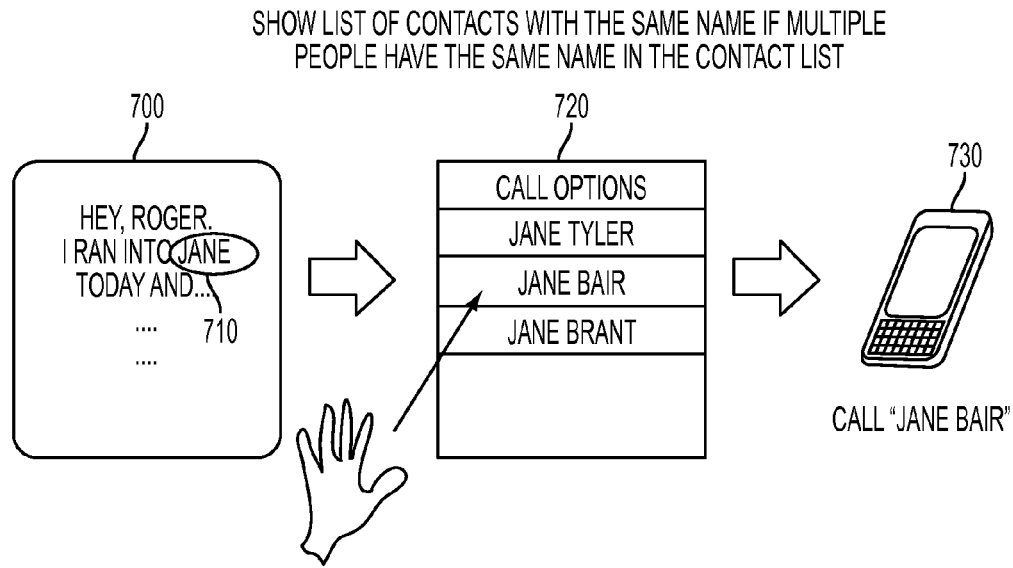
FIG. 7 depicts an example of displaying a list of contacts before placing a call in response to a gesture performed on characters displayed on a screen of an electronic device according to an embodiment of the present disclosure.

FIG. 7 depicts an example of displaying a list of contacts before placing a call in response to a gesture performed on characters displayed on a screen of an electronic device according to an embodiment of the present disclosure.

As noted above with respect to FIG. 6, once the user of the electronic device performs a gesture once the text has been selected, the electronic device searches for the contact information stored in the electronic device and calls the selected contact. However, in the event that more than one contact exists in the searched contact information an additional process is performed as explained with respect to FIG. 7

Referring to FIG. 7, once the user of the electronic device has selected text 710 from the displayed text 700 and performed a gesture, in the instant case a calling gesture, the electronic device searches through a contact list for a contact matching the text 710. However, in the event that more than one contact exists in the contact list, the electronic device displays a list 720 of all contacts having text matching the selected text. For example, in the instant case, the user of the device selects the name "Jane" from the displayed text, performs a call gesture and the electronic device searches for a contact matching the name "Jane." However, in this case, more than one "Jane" appears to be in the contact list. Therefore, the electronic device prior to placing a call outputs a list 720 displaying all contacts matching the selected name "Jane." From such list the user selects which specific contact to call and either through performing another hand gesture or by simply selecting the desired name, a call is placed to Jane's phone 730.

Figure 8:
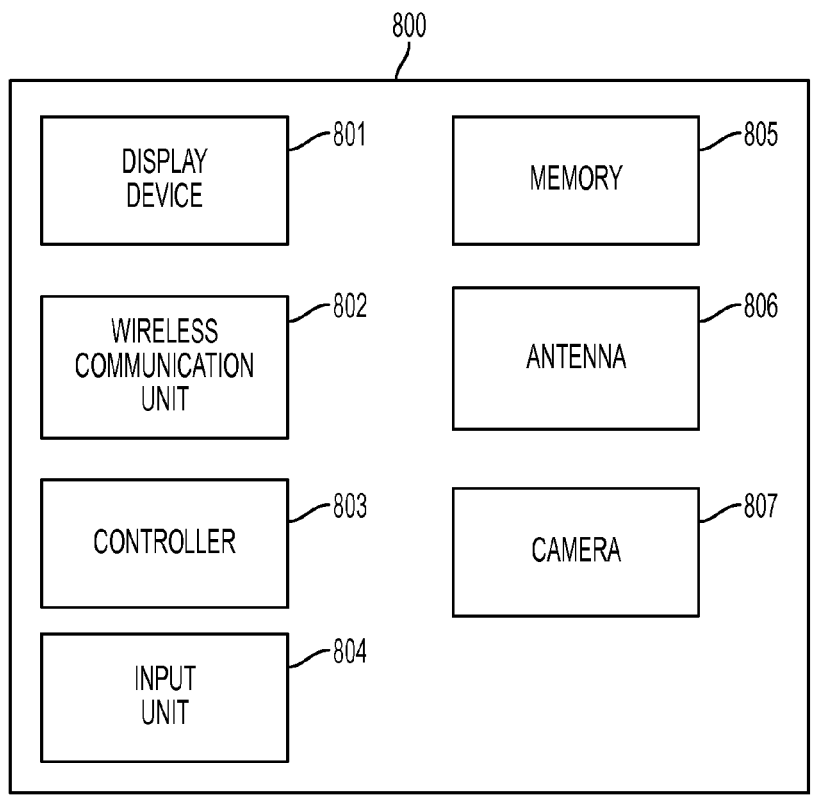
FIG. 8 is an electronic device according to an embodiment of the present disclosure.

FIG. 8 is an electronic device according to an embodiment of the present disclosure.

Referring to FIG. 8, an electronic device 800 executes a function associated with selected text displayed on the electronic device by performing a command. The electronic device 800 may be a mobile terminal, a smartphone, a cellphone, a Personal Computer (PC), a laptop PC, a tablet PC, a camera, a peripheral sensor, a portable electronic device, an any other similar and/or suitable electronic apparatus or device. The electronic device 800 may include a display device 801, a wireless communication unit 802, a controller 803, an input unit 804, a memory 805, an antenna 806, and a camera 807. However, the elements listed above are not limited thereto and the electronic device 800 may include more or less elements than those listed above.

The display device 801 may display information for a user of the electronic device 800, such as a variety of screens, multimedia content, graphics, and other information. The display unit may be a Liquid Crystal Display (LCD) device, a Light Emitting Diode (LED) display device, an Organic LED (OLED) display device, a Thin Film Transistor (TFT) display device, or any other similar and/or suitable display device for displaying information. The display device 801 may be a touch sensitive device that may receive a user input inputted according to a gesture, such as a touch gesture. Accordingly, the display device 801 may include a touch sensitive device, such as a capacitance type and/or resistance type touch input device.

The wireless communication unit 802 may be configured to transmit and/or receive wireless radio communication signals, such as Radio Frequency (RF) signals and may include other radio communication elements that are not shown in FIG. 8, such as a Digital-to-Analog Converter (DAC) configured to convert digital signals to analog signals and to convert analog signals to digital signals, a transmitter configured to transmit signals, a receiver configured to receive signals, a modem configured to modulate and demodulate signals transmitted and/or received by the transmitter and/or receiver, and any other similar and/or suitable elements used for radio communications with a wireless network and/or other radio communication devices, such as other portable terminals, transmitting and/or receiving radio communication signals. Furthermore, the wireless communication unit 802 may be a Multi-Input Multi-Output (MIMO) device and may include more than one antenna. The wireless communication unit 802 may be configured to transmit and/or receive the wireless radio communication signals via the antenna 806. Furthermore, the wireless communication unit 802 and the antenna 806 may not be included in the electronic device 800 in a case where the electronic device 800 does not perform wireless communication features. According to another embodiment of the disclosure, a wired communication unit (not shown) may be included in the electronic device 800 to perform data communication using a wired connection.

The controller 803 may be configured to control overall operations of the electronic device 800. The controller 803 may control all other elements of the electronic device 800, including, but not limited to, the display device 801, the wireless communication unit 802, the input unit 804, the memory 805, the antenna 806, and the camera 807, and any other elements, units, and/or devices included in and/or connected to the electronic device 800. For example, the controller 803 may control operations for configuring the device to perform functions in response to a command according to a method of the embodiment of the present disclosure. The controller 803 may be any suitable hardware apparatus and/or element, such as a processor, a computer chip, an Integrated Circuit (IC), an Application Specific IC (ASIC), Electronically Programmable Read Only Memory (EPROM), or any other similar and/or suitable hardware apparatus and/or element.

The input unit 804 may be configured to receive a user's input for executing operations of and to input information to the electronic device 800. The input unit 804 may be a keyboard, a button, a touch input device such as a touch screen, a touch pad, or any other similar and/or suitable touch input device and/or input device. Furthermore, although not shown in the electronic device 800, the display device 801 and the input unit 804 may be formed as one unit for displaying information and receiving the user's input, such that the electronic device 800 is a touch screen device including a touch screen unit and a display device.

The memory 805 may be configured to store data used and generated by the user of the electronic device 800 and may also store applications, a phonebook, multimedia contents, operations and executable commands, and any other data and/or information used in or generated by the operation of the electronic device 800 and/or the operation of the controller 803. For example, the memory 805, according to the embodiment of the present disclosure, may include and/or store a contact list, which may include a list of family, friends, professional contacts and/or associates, classmates, drinking buddies, community members, persons following a user and/or a user account, and persons and or public identities followed by a user, or any other similar and/or suitable group of persons known to and/or associated with the user of the mobile terminal and/or a public identity that may be managed through the mobile terminal.

The camera 807 may be used to capture an image, such as a photograph, a still image, a moving image, an infrared image, or any other similar and/or suitable type of graphical information that may be captured with a camera 807. The camera 807 may be a Charge Coupled Device (CCD) camera, a Complementary Metal Oxide Semiconductor (CMOS) camera, a Single Lens Reflex (SLR) camera, an Active Pixel Sensor (APS) camera, or any other similar and/or suitable type of image sensor and/or camera.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for executing an application in an electronic device in response to a command, the method comprising:
   receiving a plurality of nonconsecutive text selections displayed on the electronic device, the nonconsecutive text selections being received on an application screen of a first application;
   receiving a touch gesture on at least one of the plurality of nonconsecutive text selections in the application screen of the first application, the touch gesture corresponding to the command in a second application;
   performing the command by the electronic device based on the touch gesture, the command being performed on the received plurality of nonconsecutive text selections; and
   automatically executing the second application with the plurality of nonconsecutive text selections being input to the command in the second application,
   wherein the touch gesture is preassigned to execute the command in the second application.

2. The method of claim 1, wherein the text displayed on the electronic device is selected using an input device.

3. The method of claim 2, wherein the input device is another electronic device or a pen.

4. The method of claim 1, wherein the touch gesture is in a form of a character.

5. The method of claim 1, wherein the application executed by the electronic device is one of a web search, an email, a phone call, or a short message service (SMS).

6. The method of claim 1,
   wherein the touch gesture is received from a location relative to the selected text displayed on the electronic device, and
   wherein the location is predefined.

7. The method of claim 6, wherein the location is a location where the touch gesture is proximate to the selected text.

8. A method for associating an application to a command in an electronic device, the method comprising:
   detecting a selection of a first application from a menu of applications displayed on the electronic device;
   receiving a touch gesture to be performed on an application screen of the first application;
   assigning the touch gesture corresponding to a command in a second application; and
   storing the assigned touch gesture,
   wherein, upon receiving a plurality of nonconsecutive text selections on the application screen of the first application and the touch gesture on at least one of the plurality of nonconsecutive text selections, automatically executing the second application with the plurality of nonconsecutive text selections being input to the command in the second application.

9. The method of claim 8, wherein the touch gesture is in a form of a character.

10. The method of claim 8, wherein the command is one of a web search command, an email command, a phone call command, or a short message service (SMS) command.

11. An apparatus for performing an application in response to a command, the apparatus comprising:
    a memory configured to store instructions therein;
    a display device configured to display text on the apparatus;
    an input device configured to select the displayed text; and
    at least one processor that, when the instructions are executed, is configured to:
       receive a plurality of nonconsecutive text selections displayed on the display device, the nonconsecutive text selections being received on an application screen of a first application,
       execute a command based on a touch gesture received by the input device, the touch gesture being received on at least one of the plurality of nonconsecutive text selections in the application screen of the first application,
       perform the command by the electronic device based on the touch gesture, the command being performed on the received plurality of nonconsecutive text selections, and
       automatically execute the second application with the plurality of nonconsecutive text selections being input to the command in the second application,
    wherein the touch gesture is preassigned to execute the command in the second application.

12. The apparatus of claim 11, wherein the command is based on a selection of a character.

13. The apparatus of claim 11, wherein the application executed by the at least one processor is one of a web search, an email, a phone call, or a short message service (SMS).

* * * * *